(12) United States Patent
Caretta et al.

(10) Patent No.: US 7,133,736 B2
(45) Date of Patent: Nov. 7, 2006

(54) METHOD FOR DESIGNING A TIRE AND METHOD FOR PRODUCING AT LEAST ONE TIRE

(75) Inventors: Renato Caretta, Gallarate (IT); Marco Cantu', Carnate (IT); Stefano Gaiazzi, Quinzano Di Sumirago (IT); Stefano Mervic, Burago Molgora (IT)

(73) Assignee: Pirelli Pneumatici S.p.A., Milan (IT)

( * ) Notice: Subject to any disclaimer, the term of this patent is extended or adjusted under 35 U.S.C. 154(b) by 634 days.

(21) Appl. No.: 10/332,174

(22) PCT Filed: Jul. 6, 2001

(86) PCT No.: PCT/EP01/07764
§ 371 (c)(1),
(2), (4) Date: Jul. 10, 2003

(87) PCT Pub. No.: WO02/05143
PCT Pub. Date: Jan. 17, 2002

(65) Prior Publication Data
US 2004/0015333 A1    Jan. 22, 2004

Related U.S. Application Data

(60) Provisional application No. 60/218,834, filed on Jul. 18, 2000.

(30) Foreign Application Priority Data
Jul. 11, 2000  (EP) .................................. 00114840

(51) Int. Cl.
*G06F 19/00* (2006.01)
(52) U.S. Cl. ...................................................... 700/117
(58) Field of Classification Search .................. 700/96, 700/97, 98, 117, 118
See application file for complete search history.

(56) References Cited

U.S. PATENT DOCUMENTS 4,057,446 A * 11/1977 Goodfellow ................. 156/123

(Continued)

FOREIGN PATENT DOCUMENTS

EP      0 448 407 A2    9/1991

(Continued)

OTHER PUBLICATIONS

Harrison, Mary N. "Shopping for Tires", University of Florida IFAS Extension.*

(Continued)

*Primary Examiner*—Leo Picard
*Assistant Examiner*—Chad Rapp
(74) *Attorney, Agent, or Firm*—Finnegan, Henderson, Farabow, Garrett & Dunner, L.L.P.

(57) ABSTRACT

A method for designing a tyre includes defining at least one profile of the tyre based on a group of predefined dimensional constraints; defining at least one additional profile of the tyre based on predefined dimensional values of structural parts of the tyre; defining, within a cross-section of the tyre, shapes of the structural parts of the tyre; and approximating each shape by filling with a respective basic component depending on a function of the respective structural part. A method for producing at least one tyre includes obtaining information from a client's processing system; supplying the information to a manufacturer's processing system; obtaining manufacturing instructions based on the information; and manufacturing the at least one tyre using the manufacturing instructions. The manufacturer's processing system is connected to a computer-controlled tyre factory via a communications link. The at least one tyre is manufactured at the computer-controlled tyre factory.

32 Claims, 4 Drawing Sheets

U.S. PATENT DOCUMENTS

| | | | |
|---|---|---|---|
| 4,282,918 A * | 8/1981 | Tomoda et al. | 152/510 |
| 4,462,447 A * | 7/1984 | Siefert et al. | 152/454 |
| 4,580,610 A * | 4/1986 | Jackson | 152/516 |
| 5,089,970 A | 2/1992 | Lee et al. | 700/96 |
| 5,200,008 A * | 4/1993 | Enterline et al. | 156/110.1 |
| 5,278,751 A | 1/1994 | Adiano et al. | 705/10 |
| 5,710,718 A | 1/1998 | Kamegawa et al. | 703/1 |
| 5,764,543 A | 6/1998 | Kennedy | 703/2 |
| 5,822,206 A | 10/1998 | Sebastian et al. | 700/97 |
| 6,083,268 A | 7/2000 | Kelsey et al. | |
| 6,332,486 B1 * | 12/2001 | Ahn et al. | 152/454 |
| 6,550,509 B1 * | 4/2003 | Nguyen et al. | 152/209.14 |

FOREIGN PATENT DOCUMENTS

| | | |
|---|---|---|
| EP | 0 642 916 B1 | 3/1995 |
| EP | 0 664 232 A1 | 7/1995 |
| EP | 0 865 890 A1 | 9/1998 |
| EP | 0875 365 A2 | 11/1998 |
| EP | 0924 111 A1 | 6/1999 |
| EP | 0 937 570 A1 | 8/1999 |
| EP | 0 953 834 A2 | 11/1999 |
| JP | 10-307865 | 11/1998 |

OTHER PUBLICATIONS

Bridgestone Corp., "Multiple Component System Material Optimization Method . . . ," Derwent Abstract of JP Publication No. 10-055348, 1 page, (Feb. 24, 1998).

Bridgestone Corp., "Computer Aided Designing of Pneumatic tire . . . ," Derwent Abstract of JP Publication No. 2000-052716, 2 pages (Feb. 22, 2000).

* cited by examiner

METHOD FOR DESIGNING A TIRE AND METHOD FOR PRODUCING AT LEAST ONE TIRE

CROSS-REFERENCE TO RELATED APPLICATIONS

This application is a national stage entry under 35 U.S.C. § 371 from International Application No. PCT/EP01/07764, filed Jul. 6, 2001, in the European Patent Office, the contents of which are relied upon and incorporated herein by reference; additionally, Applicants claim the right of priority under 35 U.S.C. § 119(a)–(d) based on patent application No. 00114840.2, filed Jul. 11, 2000, in the European Patent Office; further, Applicants claim the benefit under 35 U.S.C. § 119(e) based on prior-filed, copending provisional application No. 60/218,834, filed Jul. 18, 2000, in the U.S. Patent and Trademark Office.

BACKGROUND OF THE INVENTION

1. Field of the Invention

The present invention relates to a method for designing and manufacturing tyres with the aid of a computer and an information data base.

In particular, the invention relates to a method for designing and manufacturing a tyre with given performance features, whereby the dimensions of the structural parts of the tyre are defined using a set of correlations between said structural parts, which is associated with the desired performance features of said tyre.

The invention also relates to a method for designing and manufacturing a series of tyres, whereby the dimensional characteristics of said series of tyres are automatically calculated on the basis of a reference tyre, the structure of which is automatically modified (method referred to in short as "parameterization") by applying a set of correlations between the structural components of said reference tyre and the corresponding structural components of the tyres in said series.

The abovementioned set of correlations is used to obtain, from those of the reference tyre, the dimensional characteristics of the structural parts of said tyres in said series characterized by the fact of having, with respect to said set, a same or different size and similar or different behavioural characteristics.

The invention relates, in addition, to an integrated method for designing and manufacturing tyres, whereby the results of the different design phases are automatically converted into operating instructions for the tyre assembly machinery.

The invention also relates to a method for designing tyres, in which the design phases are at least partially determined by information or requests received, preferably in real time, from a telecommunications network (the Internet) which interfaces a processing system of the tyre manufacturer (server system) with a processing system of the client (client system).

In particular, the invention relates to a method for designing tyres, in which said information includes requests chosen by the client from within an array of options relating to dimensional and/or performance requisites of the tyre, said array being provided by the manufacturer.

2. Description of the Related Art

As is known, in the less recent tyre designing systems, a tyre is designed on the basis of a predefined series of dimensional constraints and performance characteristics which are defined depending on the clients' requirements and are processed by the design engineer, with the aid of his/her experience and technical knowledge, until it is possible to produce a production specification substantially consisting of a table which structurally describes all the constituent parts (semi-finished products) of the new tyre, defining geometrical dimensions, materials used and processing methods.

On the basis of this table, the operating unit (factory) supplies the necessary materials, machinery and equipment and, following predefined procedures, manufactures the various semi-finished products and assembles them together so as to form a rough-finished tyre. The rough-finished tyres are vulcanized in special moulds which define the external appearance of the tyre. The product then undergoes a series of checks before being authorized for sale.

The design of tyres performed with the aid of a computer has recently been developed.

The patent U.S. Pat. No. 5,710,718 describes a method for designing a tyre, comprising the following steps:

identifying a basic tyre model represented by a cross section of the said tyre including all the structural parts thereof;

selecting a plurality of physical reference parameters for evaluating the performance features of the said tyre;

selecting dimensional values defining the overall dimensions of the tyre, its cross section and the structure of the said tyre, and a plurality of physical parameters;

defining, in connection with said dimensional values, a range of maximum deviation of the structural parts of the basic model within the cross section, for the purposes of performing an optimization calculation of said parameters;

varying the value of the range of maximum deviation until one obtains, by means of an optimization calculation, an optimum value of said physical parameters which is comparable with the values of said reference values;

redesigning the tyre on the basis of the range of maximum deviation which resulted in optimization of said reference parameters.

The patent application EP 953,834 describes a method for designing tyres, in which a basic tyre model is initially configured. A first set of variables is applied to said basic model and is used to determine conditions of the contact patch of the modelled tyre. These conditions are compared with corresponding predefined conditions of said contact patch in order to check whether the two conditions compared are convergent. If this is not so, the set of variables is incremented so as to produce new conditions for the contact patch of the modelled tyre, until values which converge towards these predefined conditions are obtained.

The set of variables considered comprises the potential wear of the tyre for which the model has been produced, the radial load exerted on the said tyre and the operating pressure.

The Applicants have observed that, in the state of the art described, the design of a new tyre comprises the step of choosing a basic tyre model, predetermining conditions or constraints representing a predefined behaviour, or predefined performance features of the new tyre, and then obtaining by means of subsequent approximations an additional tyre model which complies with the constraints predetermined at the start of the design phase, repeating a process involving modifications to and corresponding verification of the said basic model.

Recently the Applicants have developed a new method for manufacturing tyres which has eliminated the semi-finished products used in the prior art, for example the tread band, the sidewall strips, the carcass plies, the belt strips and the bead wires, just to mention a few of them. These are now replaced by only three different types of basic components which are substantially the same for any tyre and by means of which the structural parts which make up the tyre to the produced are constructed directly on a toroidal support. These three types of components are, respectively, the compound, the reinforcing cord and a rubberized fabric tape (band) consisting of a listel of compound containing two or more reinforcing cords.

The person skilled in the art, depending on the his/her different requirements and the technology available, will also be able to use a different number of basic components, for example only compounds and reinforcing cords, for example as described in the patent EP 664,232.

It is pointed out here that, in the present description, the term "reinforcing cord" refers to both individual strands and cords formed by a plurality of said strands wound together in a manner known per se.

The abovementioned toroidal support, referred to below as a drum, is a collapsible rigid support which may be extracted from the finished tyre and the radially external profile of which preferably matches the radially internal profile of the rough-finished tyre.

Except in particular cases, a tyre normally comprises several compounds of different types, for example eight compounds. The reinforcing cords may be made from textiles (usually rayon, nylon or Kevlar™) or metal, in particular with the strands consisting of HT (high tensile) steel, i.e. with a high carbon content. The bands may also be made from textiles or metal, depending on the type of cord incorporated. The Applicants prefer to use bands containing 2 to 10 cords.

The Applicants have also modified the process for assembly of the tyre, essentially eliminating the steps comprising direct movements parallel to the axis of the assembly drum, for example positioning of the bead wires, the backfolds of the ends of the carcass plies or the application of the sidewalls against the carcass, just to mention the most important ones.

This new process for assembly of the tyre is carried out by means of deposition, on the abovementioned drum, of the components designed to form the structural parts of the tyre (substantially corresponding to the parts made with the known semi-finished products according to the state of the art) using two types of movement, i.e. radial deposition, directed towards the axis of rotation of the drum, and circumferential deposition onto the surface of the drum made to rotate about its axis, or a combination of the two.

More precisely, the basic components are supplied to said drum in the form of continuous elongated parts. In a preferred embodiment, the radially deposited components are cut beforehand into portions of predefined size, while the circumferentially deposited components are cut after winding onto the drum.

These basic components have preferably a cross section with dimensions smaller than those of the structural part to be constructed and, except for the cord, preferably have a substantially rectangular shape.

More particularly, a drum is supported in cantilever fashion by the arm of a robot which is preferably of the anthropomorphic type with seven axes of rotation and which may orient the drum into any spatial position, by means of translation and/or rotation of the arm, with respect to the position for supplying of the basic component.

Typically, in this process, the band portions which form the carcass ply or plies and the belt strips are deposited with a radial movement, while the listels of compound and the reinforcing cords oriented at 0° are deposited with a spiral circumferential movement.

Preferably, the listels of compound are deposited under tension, depending on the type of composition, resulting in a stretched state of between 30% and 70% with respect to the initial length.

In particular, the carcass plies and the belt strips are constructed by depositing on the drum a circumferential succession of said pre-cut band portions by means of step-by-step rotation of the said drum. The width of the band, the angle of rotation which the drum must perform after deposition of each portion and, in the case of the belts, also the relative angle between the axis of rotation of the drum and the axis of the band portion are determined beforehand.

In a different process, according to the patent EP 664,232, radially deposited components are radially deposited on the drum with a continuous alternating movement around the torus-shaped surface of the said drum, while the latter rotates about its axis. In combination with this technology, structural parts consisting of the compound alone may be applied using a controlled-volume injection process.

SUMMARY OF THE INVENTION

The Applicants have ascertained that the abovementioned process comprising radial and circumferential movements allows a very high degree of flexibility during planning of the various tyre models to be made since, owing to the substantial similarity of the basic components for each type of tyre, it is possible to produce a sequence of tyres in which each tyre may be different from the preceding one.

In fact only the number of revolutions of the drum for the components applied circumferentially and the axial extension of the radially applied components may vary from tyre to tyre.

The Applicants have now found that the abovementioned method for manufacturing tyres, i.e. by means of deposition of the components with a radial or circumferential movement or a combination of the two, also allows a very high degree of flexibility during design of the tyre. The Applicants have furthermore found that this method allows the possibility of automating, preferably on the basis of the structure of a reference tyre, from now on referred to as "prototype", the design of other tyres with the same or different size and with the same or different performance features. This invention may also be applied to different tyre production methods.

The Applicants have realized that the construction of structural parts of the tyre using listels of compound with small cross sectional dimensions, i.e. dimensions which are a submultiple of the final dimensions of the cross section of the structural part in question, is able to overcome a significant constraint according to the prior art. The need to use a separate series—as regards dimensions—of semi-finished products in order to obtain structural parts prevented the structural parts themselves from being regarded as a continuous function with regard to their dimensions.

Analysing a series of prototypes designed in the manner indicated, the Applicants have found that the type and degree of behavioural performance of the tyre (for example the comfort in relation to stability at high speed or grip on wet surfaces) may be associated with particular correlations between given dimensional values of said structural parts of the tyre.

The Applicants have realized and ascertained experimentally that maintaining said correlations in the structure of tyres having dimensions different from those of the prototype allowed said tyres to be assigned a type and level of performance in keeping with those of the abovementioned prototype.

The Applicants have realized and ascertained experimentally that changing said correlations in the structure of tyres having dimensions the same as or different from those of the prototype allowed said tyres to be assigned a type and level of performance different from those of the prototype. In the most complex case, if the set of correlations which associates the structure of the tyre with a given type of behavioural performance is known, according to the invention proposed by the Applicants, it is possible to convert automatically the definitive structure (dimensional values) of at least one prototype into the definitive structure of other tyres which are dimensionally different from the prototype and have the required performance features different from those of the prototype.

The Applicants have found that the knowledge of several sets of correlations and the performance features associated with each set allows the design engineer to define automatically, on the basis of a prototype with a known structure, for each tyre type different from the prototype, the structure most suited for the type of performance required.

Within the context of the present invention, the term "tyre structure" is understood as meaning essentially the set of the geometrical forms and materials which characterize the cross section of the tyre. In this context, the geometrical forms of the individual structural parts are associated with each other by means of mathematical functions or, preferably, sets of mathematical functions, found to be efficient in the optimization of particular performance features of the tyre.

In this way, the tyre design process does not define the absolute values of the geometrical parameters which describe a structure, but the "functional" rules by means of which said geometrical forms interact with each other depending on a given category of performance features.

Verification of said functional correlation rules may be performed by means of simulation using mathematical calculation, for example finite element analysis (FEA) or by means of acquisition of experimental know-how.

In accordance with the invention, the design process converts, moreover, the absolute values of the geometrical parameters of a given tyre structure into the absolute values of the geometrical parameters of a different tyre structure.

According to a first aspect thereof, the invention relates to a method for designing a tyre comprising a plurality of structural parts which are different from each other in terms of dimensions, composition (what they are made from) or position within the cross section of said tyre, said cross section being delimited by a radially external profile and by a radially internal profile, each structural part comprising a basic component, said method including the steps of:
  predefining at least one of said profiles,
  generating the other profile on the basis of predefined dimensional values of said structural parts,
  generating, within the cross section of said tyre delimited by said external and internal profiles, the shapes (contour of the cross section) of said structural parts,
  filling each of said shapes with the corresponding (constitutional) basic component, preferably by overlapping or arranging next to each other transverse sections of said basic component.

Preferably, one of said structural parts comprises at least one carcass ply arranged within said cross section along a predefined profile. The position of this carcass ply profile may be determined on the basis of one of said internal or external profiles, in keeping with the presence and the position of the other structural parts. Alternatively, this carcass ply profile may be defined initially and the position of the internal and external profiles determined in keeping with the presence and the position of the other structural parts.

Preferably, said method associates with each of said structural parts a first group of absolute parameters. Preferably, said method associates with each of said structural parts a second group of parameters which may be modified. Even more preferably, said absolute parameters define dimensional values of said structural parts. Alternatively, or in addition, they define chemical and physical properties of the material forming said structural parts.

Preferably, the method calculates at least one of said dimensional values which may be modified as a function of the distance between the profile of said at least one carcass ply and one of said external or internal profiles.

Preferably, the method calculates at least one of said dimensional values which may be modified by applying a predefined set of functional correlations.

According to one aspect thereof, the method according to the invention comprises the step of ensuring that at least one portion of the profile of said at least one carcass ply within said cross section of the tyre satisfies the condition:

$$\rho \cdot y = \text{constant}$$

(where $\rho$=radius of curvature and y=distance of the point on the profile from the fitting diameter).

Preferably, the method envisages that said condition should be satisfied at least in the zone of the sidewalls of said tyre cross section.

Preferably, the method according to the invention envisages that said profile of said at least one carcass ply should be that corresponding to the inflated condition of said tyre.

Preferably, the method according to the present invention envisages that the step of defining said radially external profile of said tyre comprises the step of predefining at least one dimensional constraint chosen from the group comprising the fitting diameter, the external diameter, the height of the sidewall and the maximum chord of said tyre.

According to an aspect thereof, the invention relates to the fact that said filling step is performed by positioning (arranging next to each other and/or on top of each other) a plurality of cross sections of said basic component of each structural part.

Preferably, said positioning generates instructions for manufacture of the structural part associated with each shape.

Still preferably, said manufacturing instructions comprise positioning of a point along the cross section of said basic component with respect to a spatial reference point in the manufacturing plant and orientation of at least one portion of the contour of said cross section with respect to a reference axis, preferably the axis of rotation of an assembly drum.

According to another aspect, the invention relates to the fact that said positioning step is governed by at least one correlation between geometrical dimensions of at least two of said structural parts forming said tyre.

Preferably, the following pairs of parameters are placed in mutual correlation, as an alternative to or in combination with each other: the width of the tread and the height of the sidewall, the height of the sidewall and the curvature of the tread, the height of the bead filling and the height of the sidewall, and the carcass radii and the tread radii. These correlations are combined in several sets, each of which identifies a different category of performance features of the tyre.

Preferably, after fixing one or more values of said geometrical dimensions for a tyre of a different size, said at least one correlation defines the corresponding values of said geometrical dimensions for tyres of a size different from the given size.

Preferably, said definition of values for tyres of a different size is performed automatically.

According to an aspect thereof, the invention relates to the fact that said tyre is structurally defined by a plurality of operating procedures, each of which comprises manufacturing instructions or machine cycles for each structural part of said tyre.

According to a further aspect, the invention relates to the fact that at least one of said dimensional constraints or of the absolute values of said first group of values is derived from a specific request of a client.

Preferably, said request is directly introduced into said group of dimensional constraints or into said first group of values by means of on-line connection between a processing system of the client and a processing system of the manufacturer.

According to a further aspect of the present invention, it has been found that, by means of a method for designing a tyre based on the use of predefined basic components organized together on the basis of correlation equations satisfying preselectable requirements, generating corresponding manufacturing instructions, it is possible to receive from a client, via communications network between computers, public network (for example the Internet) or dedicated network, a set of requests relating to a tyre and comprising dimensional and/or performance requirements, define in response to these requests a convenient tyre structure and the associated constructional procedures and carry out, preferably in real time, the construction of one or more tyres having characteristics which satisfy said requests.

BRIEF DESCRIPTION OF THE DRAWINGS

Further characteristic features and advantages of the present invention will emerge in greater detail from the following description and with reference to the accompanying drawings provided solely by way of a non-limiting example.

In particular.

DETAILED DESCRIPTION OF THE EMBODIMENTS

Figure 1:
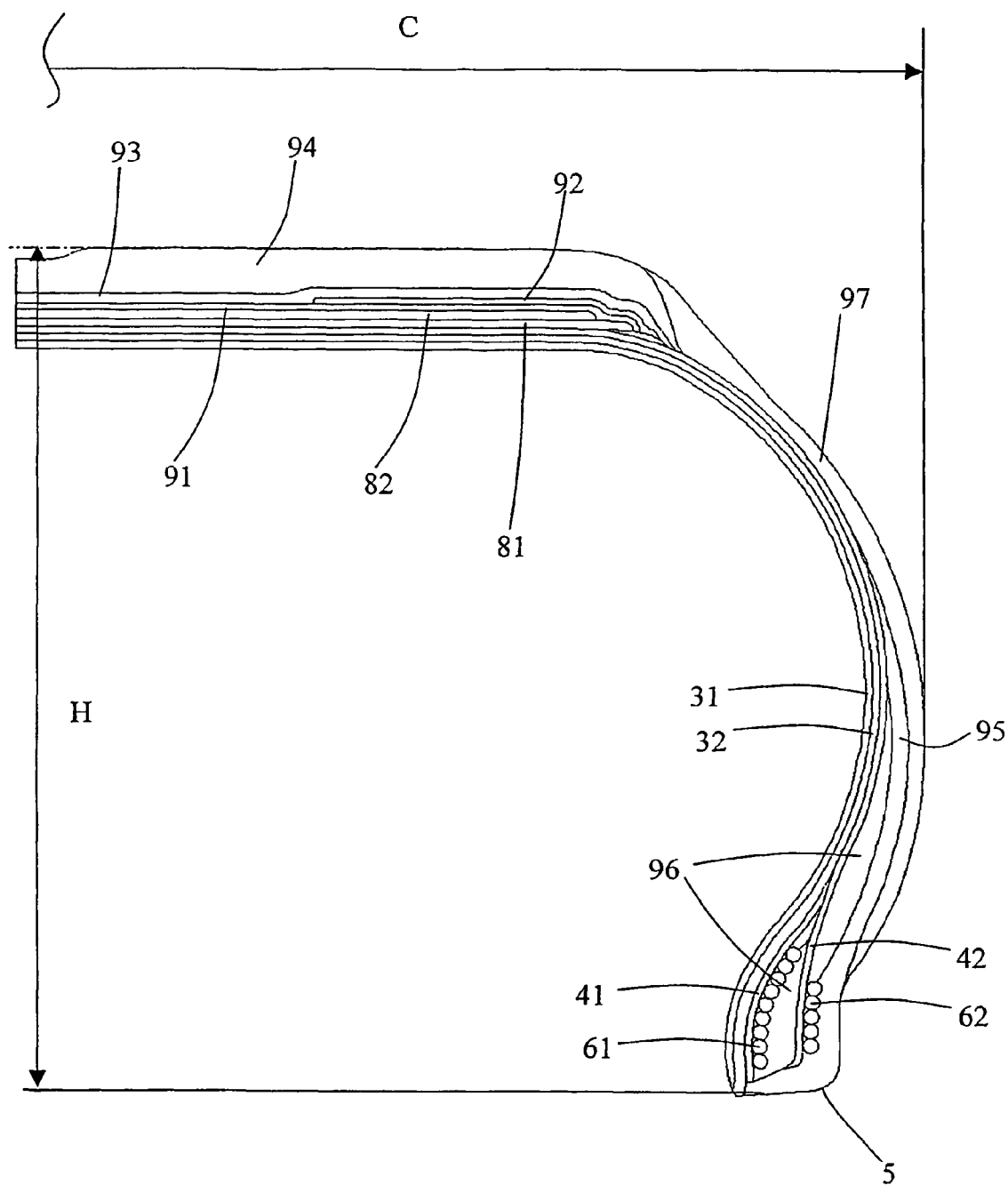
FIG. 1 shows a partial cross section of the structure of a tyre according to the present invention illustrating in particular the structural parts forming part of said section configured in accordance with the profile of the vulcanization mould.

FIG. 1 shows a radially sectioned view of the general structure of a tyre for vehicle wheels, designed in accordance with the present invention.

Traditionally, the tyre consists of an internally hollow, toroidal, structure, usually known as a carcass, comprising a plurality of structural parts which are assembled together and having two beads each defined along an internal circumferential edge thereof for fixing the tyre onto a mounting rim. Said carcass comprises firstly at least one carcass ply and at least one pair of annular reinforcing cores, usually called bead wires, which are circumferentially unextendable and contained inside said beads, i.e. at least one bead wire per bead.

The carcass ply includes a support structure, which comprises textile or metal cords and the end edges of which are each associated with a corresponding bead wire and which axially extends from one bead to the other so as to form said toroidal structure.

In tyres of the so-called radial type, the abovementioned cords lie essentially in planes containing the axis of rotation of the tyre or slightly removed therefrom.

This carcass is provided, on its crown, with an annular overstructure, known as a belt structure, which is normally composed of one or more rubberized fabric strips, which are radially superimposed on each other so as to define a so-called "belt pack", and a tread band made of elastomer material, wound around the belt pack and provided with a moulded design in relief for the rolling contact of the tyre on the road. Moreover, the carcass is provided, in axially opposite lateral positions, with two sidewalls which are made of elastomer material and each of which extends radially towards the outside from the external edge of the corresponding bead.

In tyres of the so-called tubeless type, i.e. of the type which do not require the use of an inner tube during operation, the internal surface of the carcass is normally lined with a so-called liner, namely one or more layers of elastomer material which are impermeable to air. Finally, the carcass may comprise other known parts, such as reinforcements, listels and fillings of a number and type depending on the specific tyre model to be made.

It must be pointed that, for the purposes of the present description, the term "elastomer material" is understood as meaning a rubber compound in its entirety, i.e. the assembly formed by at least one polymer base suitably combined with reinforcing fillers and/or process additives of various types.

In particular, the cross section according to FIG. 1, shows, progressing radially from the inside towards the outside, some of the abovementioned structural parts, i.e. a first liner layer 31 and a second liner layer 32, the ends of a first series of band portions 41 of a carcass ply 40 and the ends of a second series of band portions 42 of said carcass ply.

In the bead zone of the tyre, moreover, a first bead wire comprising nine cord turns 61 and a second bead comprising five cord turns 62 are shown. The crown zone of the tyre is provided with a belt pack comprising a first belt strip 81 and a second belt strip 82 which are arranged on top of each other, a first layer 91 of nylon cords oriented at 0°, which covers all the belt layers and a pair of layers 92 of nylon cords oriented at 0°, which cover only the end zones of the belt strips.

A tread band 94 provided with an underlayer 93 is arranged on top of the above layers.

The bead zone is also provided with a first filling of anti-abrasive compound 95 and a pair of fillings 96 made of compound with a high hardness factor and arranged in the bead zone, i.e. one between the first band portions 41 and the second band portions 42, the other between the second band portions 42 and the anti-abrasive filling 95. A pair of sidewalls 97 radially extending from the bead zone to the shoulder zone of the tyre line the carcass and come into contact with the side edges of the tread band 94.

The definition of the tyre structure within its cross section defines the whole tyre since it is a solid of rotation.

According to the invention, the cross section of the tyre and each of the structural parts forming part thereof have, associated with them, a first group of absolute dimensional values and a second group of dimensional values which can be modified.

The absolute values may be chosen from a range of possible values, but once they have been chosen they cannot be changed within the same design model since they define dimensional and structural constraints thereof, which must be complied with. As regards the tyre cross section, absolute values are, for example, the external diameter, the maximum cord during inflation and the fitting diameter, i.e. the overall dimensions of the tyre.

As regards the basic components, the absolute values are, for example, the dimensions of the reinforcing cords, the thickness of the band and the cross sectional dimensions of the listel.

In particular, as regards the basic components, initially the width of the pre-cut band portions (for example the portions of the carcass plies and the portions of the belt strips) and the width and the height of the listel are chosen and, in accordance with these values, the dimensions of the nozzles of the extruders supplying the elastomer material are defined.

The values which may be modified are those which may vary in accordance with predetermined correlation equations, in order to comply with given congruency conditions.

As regards the tyre cross section, values which may be modified are, for example, the tread width, the value of the cross sectional ratio H/C (cross sectional height/maximum chord), and the height and curvature of the sidewalls.

As regards the structural parts of the tyre, values which may be modified are, for example, some geometrical dimensions, for example the linear extension of the band and the dimensions and shape of the elastomer structural parts.

Each tyre model is essentially distinguished from the other models by a set of chemical and physical, structural, dimensional and external appearance characteristics and by its peculiar performance characteristics, such as handling, comfort, roadholding, noisiness, etc.

The chemical and physical characteristics are essentially dependent upon the type and composition of the materials, in particular the formulations of the various compounds used in the manufacture of the elastomer materials. The structural characteristics essentially define the number and the type of the structural parts present in the tyre and their mutual position within the structure of the latter.

The dimensional characteristics refer to the geometrical measurements and to the cross-sectional profile of the tyre (external diameter, maximum chord or width, height of the sidewall and height/chord ratio, i.e. cross sectional ratio) and will be referred to hereinbelow simply as "size" or "sizes". The external appearance characteristics comprise, typically, sculpting of the tread rolling surface, ornamental patterns and various writing or distinguishing symbols reproduced on the tyre, for example on the tyre sidewalls, and in the remainder of the present description will be referred to overall—albeit in an improper manner—as "tread pattern".

Figure 3:
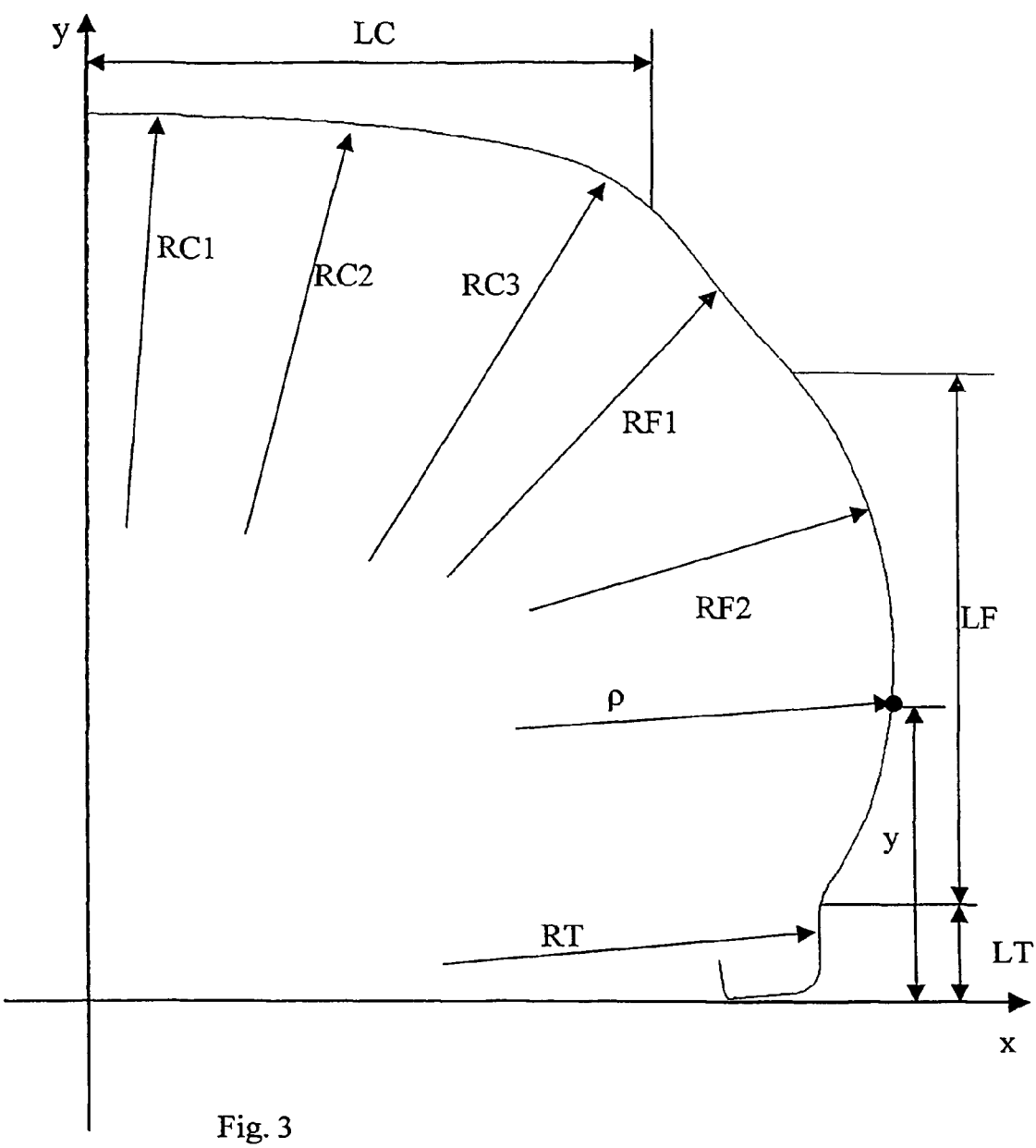
FIG. 3 shows the external profile of a tyre in the configuration according to FIG. 1, with the radii of curvature in certain points indicated by ρ and the associated heights by y.

In the following description, for the purposes of the present invention, the following are also defined:

tyre model: a tyre having a predefined size, predefined structural parts in its cross section and a predefined tread pattern;

inflation profile of the carcass: the profile along the neutral axis of the carcass plies within the tyre cross section, in the tyre inflated to its nominal operating pressure under zero load conditions;

moulding profile of the tyre: the external profile of the tyre corresponding to the profile of the vulcanization mould with which the external surface of the tyre comes into contact during the vulcanization step;

tyre assembly profile: the internal profile of the tyre, preferably corresponding to the profile of the assembly drum with which the internal surface of the tyre remains in contact during construction of the said tyre;

carcass equilibrium profile: the profile along the neutral axis of the carcass plies within the cross section of the tyre inflated to its operating pressure under zero load conditions. This profile satisfies the equation:

$$\rho \cdot y = K \cdot p = CONST$$

where $\rho$, $y$ have the meaning defined above and are indicated in FIG. 3, $p$ is the value of the inflation pressure and K is a constant.

A tyre, the carcass of which has an inflation profile substantially aligned with the equilibrium profile along at least a portion of its extension, distributes in an optimum manner, and in particular minimizes, the stresses generated by the vehicle and the road within the tyre structure during operation.

Let us now assume that it is required to design a new tyre which has a main specific performance compared to the set of performance features which each tyre must have, for example a tyre for a very good driving performance (directional stability, road holding, slip thrust, responsive steering, etc.), whereby the characteristics such as comfort, noisiness, abrasion resistance, etc. assume less importance. For the sake of convenience, we shall define below such a tyre as being "handling oriented".

In this example, the tread pattern is preferably designed and defined using conventional techniques. The design engineer, on the basis of his technical knowledge, his experience and his knowledge of the structure of known tyres which have proved to possess a good qualitative level as regards the same specific performance, fixes the absolute values within the first group (absolute values); this group of values, as mentioned above, includes dimensional, structural and functional parameters.

A first data entry mask stores the predefined dimensional parameters, which comprise the significant parameters which define at least one of said (moulding, assembly or carcass) profiles.

In the example illustrated in FIG. 1, the cross section of the tyre has been obtained on the basis of the moulding profile of the tyre.

A design method, which may be developed in a known manner, defines preferably automatically the moulding profile of the tyre by means of entry of said significant parameters into said first data entry mask within which each item of data is stored in a corresponding field.

These significant parameters, which are associated with the external profile, preferably comprise (as shown in FIG. 3):

size of the tyre to be manufactured;
maximum dimensions of said external profile of the tyre (height of section H, maximum chord C);
dimensions of the external profile in the crown zone of the tyre LC;
dimensions of the external profile of the sidewall of the tyre LF;
dimensions of the external profile of the bead of the tyre LT.

The abovementioned significant parameters of the external profile of the crown, sidewall and bead of the tyre result in a subdivision of the external profile of the tyre into several segments each having a respective radius of curvature. In particular, in the example shown in FIG. 3, a first crown sector with a radius of curvature RC1, a second crown sector with a radius of curvature RC2, a shoulder sector with a radius of curvature RS1, a first sidewall sector with a radius of curvature RF1, a second sidewall sector with a radius of curvature RF2 and a bead sector with a radius of curvature RT.

The structural parameters consist of the number, type and mutual position of the structural parts which form the tyre model being designed, as well as the characteristics of the basic component of each of them. These structural parameters may be defined by means of a second data entry mask.

In particular, in said second mask, the following may be defined:

the number and the structural composition of the carcass plies which are applied, for example: first ply and second ply, spacing or arrangement, alongside, of the band portions of each ply;
the number of belt strips, for example first strip and second strip;
the number of layers of cords at 0° and, for each layer, the number of turns, for example a single layer with a number of turns such as to line the underlying belt strips over their whole width;
the number and the location of the bead wires and, for each bead, the number of turns, for example a first bead wire applied against the first series of carcass portions and a second bead wire applied against the second series of carcass portions;
the shape and position of elastomer structural parts, for example tread band, sidewall, anti-abrasive listel.

For each of said elastomer structural parts it is also possible to choose the elastomer material from which they are made.

According to an alternative mode of application of the invention, the structural parts of the cross section are chosen and positioned and their dimensions defined by the program on the basis of operating data of the tyre such as the pressure, the load applied (or the type of vehicle, the speed category, the performance category and so on. This data may be supplied by the client.

The functional parameters consist of the required performance category and the rules or the set of correlation rules or equations associated with each performance category.

For example, said performance categories are selected from a group which includes high performance, comfort, specific grips for dry, wet, snow-covered, icy and other road surfaces.

According to the invention, a tyre may have, associated with it, several performance models, each associated with its own set of correlation equations. In the case where these associations or combinations of models are different within the same tyre, one or more of the correlation equations may be modified or deleted in order to avoid the presence of equations which are incompatible with each other. Correspondingly, the overall performance of the tyre obtained in this way will be a compromise—normally the best compromise—from among the required performance features owing to the practical impossibility of achieving simultaneously the maximum mutually antithetic performance level.

The greater the number of equations in the set and/or the number of sets of equations, the greater will be the possibility of producing tyres which satisfy, as closely as possible, the clients' requests.

Preferably, in this case a tyre will be identified by a performance level, within each performance category, which is assigned a code ranging between a minimum value and a maximum value, for example on scale of 1 to 5.

The absolute value of the performance level corresponding to the values thus coded may vary with the tyre category including size, cost and type (where type is understood as meaning, for example, comfort, sportiness, comfort/sportiness, handling, roadholding in wet conditions and so on).

Figure 2:
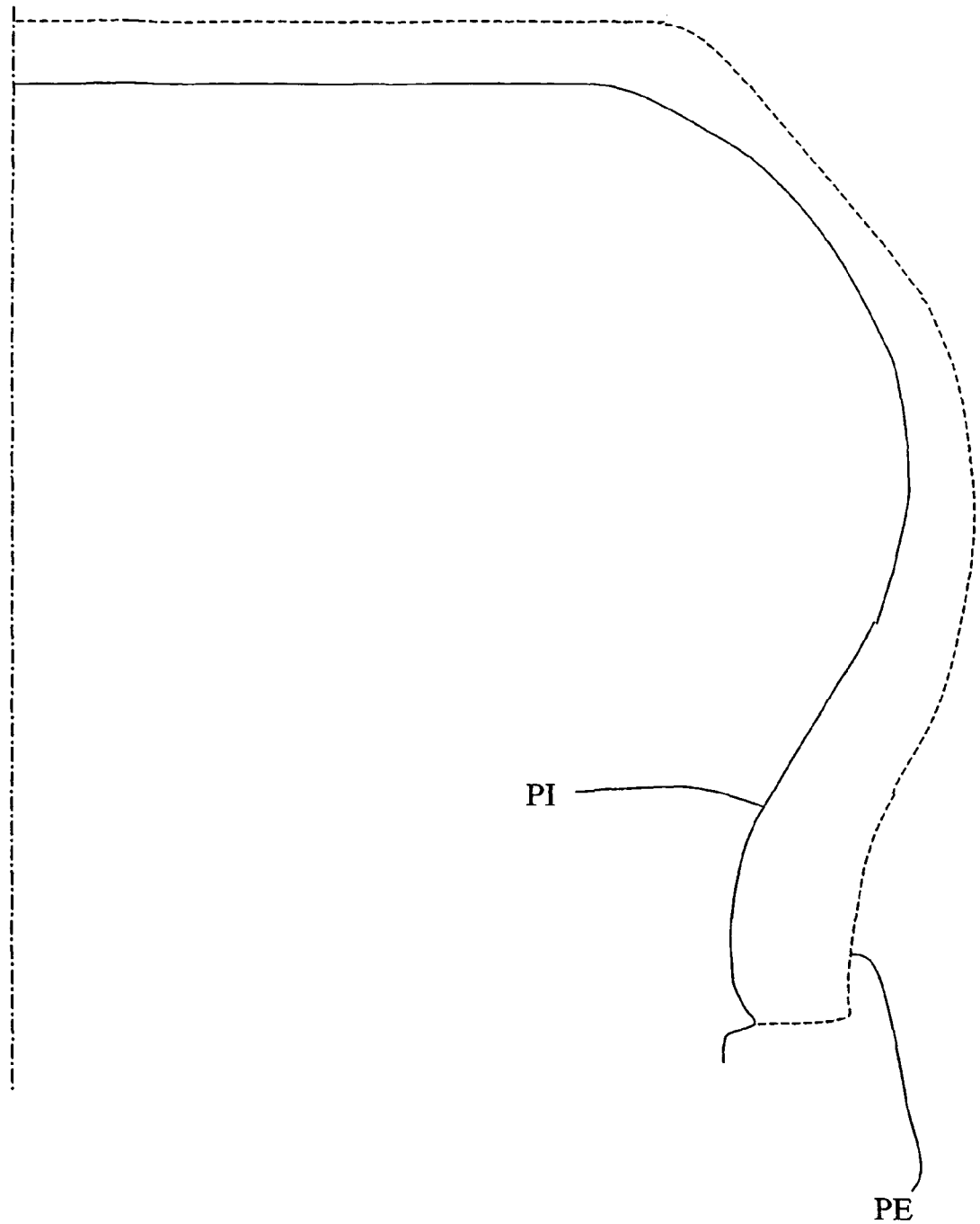
FIG. 2 shows the external and internal profiles which delimit the cross section of the tyre according to FIG. 1, configured on the assembly drum.

Once these parameters have been entered, the abovementioned design method defines, in particular also graphically, the structure of the tyre being designed: in other words it defines, first of all, the cross section of the tyre by means of the external profile PE and internal profile PI of said tyre (FIG. 2).

It must be noted that said profiles are preferably defined on the basis of a predefined profile: preferably said predefined profile is chosen from the profile of the carcass plies in a predefined condition, for example inflated condition, and the moulding profile of the tyre, as in the case illustrated.

In accordance with the invention, the design of the external profile processed in the manner indicated defines the dimensions of the vulcanization mould: it is stored in a data base or similar instrument and may be sent electronically, in real time, or with a delay after recording on a suitable medium, preferably in real time, to a mould manufacturer who manufactures the corresponding mould.

Within said cross section, the abovementioned design method defines, by means of application of the correlation equations assigned, the profile of the carcass and belt plies, as well as the shape, i.e. the contour profile of the cross section of all the structural parts present in the said cross section.

In particular, in the case of the carcass plies and the belt strips, it determines not only the position of their profile within the cross section of the tyre, but also the progression of the abovementioned profile, defined by a series of radii of curvature. In the case of the carcass ply or plies, this profile corresponds preferably to the equilibrium profile along at least part of its extension, preferably at least in the sidewall portion between shoulder and bead.

The cross section illustrated in FIG. 1 was obtained on the basis of the moulding profile of the tyre: the complete design of the tyre showing all the areas occupied by the structural components, in accordance with the moulding profile defined above, and hence the actual dimensions of the vulcanized tyre, in the remainder of the description is defined as being the moulded tyre cross section (MTC design).

The cross section of the moulded tyre is converted into the cross section of the tyre as constructed on the drum, so as to allow completion of the said cross section with filling of the shapes of the structural parts with the corresponding basic components. In the remainder of the description the design of the cross section on the drum is identified as the drum tyre cross section (DTC).

The aforementioned design method automatically converts the MTC design into the DTC design, applying predefined conversion equations which take into account, among other things, characteristics of the materials (such as elasticity of the cords and plasticity of the compounds), any dilation introduced during the vulcanization stage, etc.

FIG. 2 shows a design of the profile of the cross section of the tyre comprising the internal profile PI and the external profile PE. In accordance with the invention, the design of the internal profile processed in the manner indicated defines the dimensions of the assembly drum: it is stored in a data base or similar instrument and may be sent electronically, in real time, or with a delay following recording on a suitable medium, preferably in real time, to a drum manufacturer who proceeds with manufacture of the associated drum.

A third data entry mask may allow entry of data which define the internal assembly profile of the tyre and consequently the dimensions of the drum.

Figure 5:
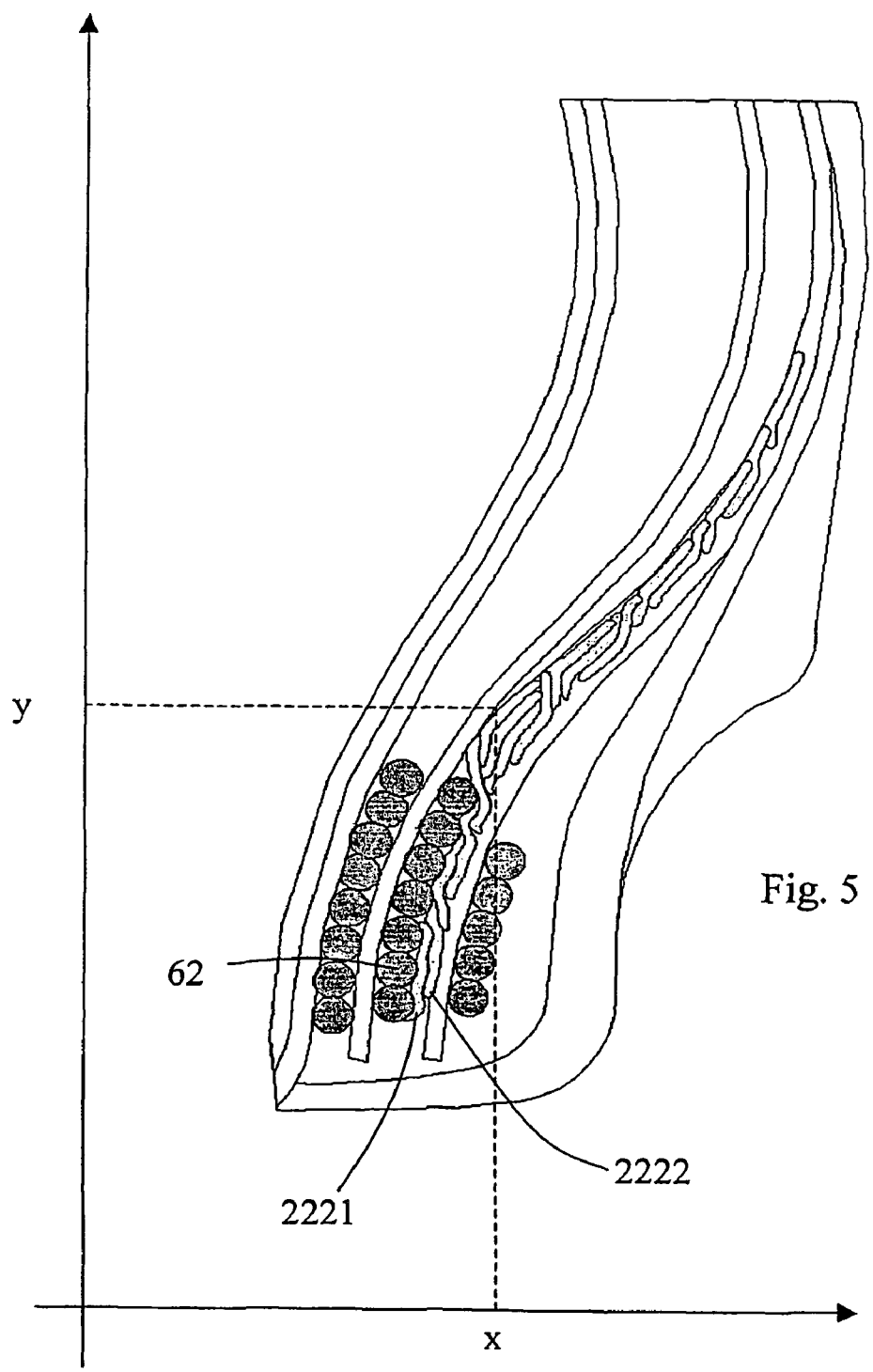
FIG. 5 shows a small portion of the cross section of a drum on the assembly drum, in which partial deposition of the basic component according to FIG. 4 is illustrated.

FIG. 5 shows the portion of a bead of an MTC design.

The design engineer fills each shape of the structural parts made of elastomer material with a listel of corresponding material by means of the arrangement, next to each other, of a plurality of cross sections of said listel.

Preferably, the dimensions of the basic component to be used, i.e. the aforementioned listel of compound, in particular the width and height of the cross section of said listel, as well as the material from which it is made, are predefined values. Preferably, the abovementioned cross section has maximum dimensions of between 3 and 12 mm. More preferably, this cross section has a substantially rectangular shape, with dimensions of 3×7 mm.

FIG. 5 shows the partial deposition of said listel for filling the shape of an elastomer structural part situated in the bead zone of the tyre. The figure shows how filling is performed by means of arrangement next to each other, including overlapping, of a plurality of cross sections of said listel.

A graphics processing program, which may be developed using known methods, provides the operator with the complete design of the cross section of the tyre, the cross section of the shapes of all the structural parts of the tyre and the listel with the aforementioned dimensions.

By means of a manual dragging device, the design engineer arranges the cross sections of the listels inside the area of the shape, superimposing them partially on top of each other. In particular, in FIG. 5 the design engineer has started to position a first section 2221 of the listel in the vicinity of the second bead wire 62.

This operation is performed by removing, for example by means of the computer mouse, the section of a graphics window made available by the program and dragging it into the filling shape which is graphically displayed, until it is positioned in the vicinity of its final arrangement position.

The program determines exactly the definitive position of each section, calculating the modification to the shape of said sections, due to the plasticity of the material forming the said listel and caused by any stretching during deposition and by the mutual overlapping between adjacent basic components. This modification in the cross sectional shape is calculated on the basis of the previously stored characteristics of the material from which the listel is made.

At the same time, for each section positioned within the shape, the following are stored:

the position (x, y) of a significant point, for example the middle point in the bottom side of the listel cross section, with respect to a fixed reference point, for example a pair of Cartesian axes, integral with the drum, and the angle of orientation α of the deposited section with respect to a fixed reference point, for example the axis of rotation of the drum.

Figure 4:
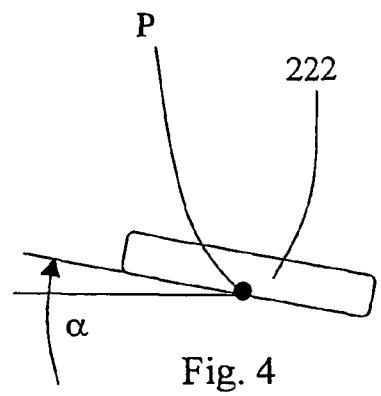
FIG. 4 shows a cross section of a basic component, consisting of a listel of compound.

FIG. 4 shows a cross section through the elongate listel 222 showing the point 2, the coordinates (x, y) of which are stored, and the angle of orientation α.

In FIG. 5 it can be seen how the section 2221 of the listel is deformed owing to its contact with the turns of the bead wire 62. At the same time the final position (x, y, α) of this part is stored, as defined above. The design engineer at this point removes a further section 2222 of the listel and, using the same methods, arranges it in the vicinity of the first section 2221. The program determines the final position, partially superimposing the additional section 2222 on the first section 2221, deforming it according to its degree of plasticity.

The final position (x, y, α) of this section 2222 is also stored. The method continues until all the space intended for this particular structural part has been completely filled.

With this storage operation, which is also of a short duration, in accordance with the invention, the operating procedure which includes the manufacturing instructions necessary for allowing the robot to wind the listel onto the drum with the intended direction and number of turns is automatically generated.

The method is repeated for each structural part which has a listel as a basic component.

These elongate components, in the abovementioned plant, are supplied preferably by an extruder and wound onto the drum with circumferential deposition performed by rotating the drum in front of the extrusion head. Therefore, by drawing within the cross section of the tyre, the area occupied by the cross section of each listel, the actual deposition over the whole tyre by means of rotation of the drum is reproduced.

This technique for filling the shape of the structural parts of the tyre is not limited to the listel of elastomer material, but may be applied to all the basic components applied onto the drum by means of circumferential deposition.

Other basic components, typically the reinforcing cord of the bead wires and the band of cords arranged at 0°, may be inscribed within the cross section of the tyre, and more precisely within the shape of the corresponding structural part by dragging their cross section inside the said shape.

The deposition sequence for each circumferentially deposited structural part comprises the co-ordinates of all the abovementioned points within the cross section of the tyre. During formation of the tyre on the drum, the robotized arm which moves the drum determines, for each complete rotation of the said drum, the change in position from a set of three co-ordinates (x, y, α) to the next set of three co-ordinates until deposition of the structural part has been completed.

All the structural parts described above are constructed in accordance with a predefined sequence so as to form a new tyre model which is stored in the form of said sequence of successive (radial and circumferential) application of these structural parts onto the assembly drum.

In this way, for each tyre model, information as to the sequence of application of the structural parts and, for each part, information as to the shape, position and material used is provided.

On the basis of the DTC design, the deposition sequences of the basic components are generated separately from each other.

The need to describe the procedures for application of the basic components onto the assembly drum requires the availability of a DTC design. If the initial design is an MTC design, it is converted into a DTC design (tyre on the assembly drum) as indicated above.

At the end of deposition of all the structural components, each tyre model is described by a plurality of operating procedures, each comprising a sequence of manufacturing instructions (comprising machine cycles).

Conveniently, for the purposes of the invention, the various sequences are stored in a data base.

Each of said sequences comprises essentially:
- the type of basic component to be deposited (continuous elongate component or band portion) and therefore the type of deposition (circumferential or radial);
- the dimensions of the component (cross section for the continuous elongate component or cross section and length for the band portion);
- the material to be used (compound for the continuous elongate component or composition of the band portion, if necessary including number and type of associated cords);
- a sequence of handling instructions for an operational handling apparatus (for example the automated arm for circumferential deposition or the working unit for radial deposition).

In accordance with the invention, the design stage generates automatically a plurality of procedures which essentially reproduce the sequences for application of all the structural components, which are determined during the design stage and by means of which the tyre production plant creates the new tyre models.

These procedures, preferably each containing a sequence for application of a structural part, are preferably resident in a data base from where they are suitably taken so as to be sent to a corresponding manufacturing unit of the production plant.

All the information relating to each processed tyre model, according to the invention, is stored in a data base of producible tyre models. The data base may be updated in accordance with needs, data or correlations being added or replaced, for example each time a new tyre model or a different correlation or set of correlations is defined.

In particular, for the purpose of responding automatically to the expected requests of a client, who requires tyres characterized by a complex set of performance features, each associated with a set of correlations, the data base contains sets of correlations and mechanisms for choosing them, if necessary in a hierarchical order, so as to respond individually to the request received.

Preferably, the data base associates with each producible tyre model an SI (specific identity) identification code SI and a plurality of address fields, each of which addresses one of the procedures as defined above.

Preferably, said SI code associates with each producible tyre model a classification corresponding to the structural and functional specifications initially described. For example, for each tyre model stored in the data base, information as to the sizes available, the performance categories, the tread patterns, etc., is provided.

Each time that it is required to design a new tyre model, it is possible to draw from the data base the information relating to the procedures for production of all the tyre models already designed and combine them together in order to check whether one of them, or a combination of them, satisfies the requirements of the new desired model. The provision of the abovementioned information and correlations in a data base allows one to obtain in a short period of time a large number of combinations of all the dimensional, structural and functional parameters of a different type, including those which define a new tyre model which satisfies the predetermined design constraints.

A new tyre model is preferably constructed on the basis of functional rules which are already stored, in terms of correlations between structural constraints or physical and/or dimensional parameters, applying them to a specific reference tyre, which is also already stored, in order to obtain the structures of the new tyre model, the dimensions of which are already defined in terms of absolute value.

Table 1 illustrates a typical example of application of the invention with reference to the design of two different tyres, according to the specific request of a client having requirements not satisfied by the tyre models available on the market.

This request was provided in a traditional manner, although, with the aid of available communications techniques (for example the Internet, similar to that which is happening in various commercial or business sectors), it is possible to receive the said request via a network of computers which are connected together, as described below.

In particular, the request was for a model with good comfort properties (Variant A—Comfort-oriented) and one with good handling properties (Variant B—Handling-oriented), both having a predefined size, in particular with a 16" fit.

In accordance with the invention, two sets of equations, i.e. two groups of correlations between dimensional values of the tyre cross section, were selected beforehand, said groups being defined respectively as COMF_1 (that relating to a comfort-oriented performance) and HAND_1 (that relating to handling-oriented performance).

In a preferred mode of implementation of the invention, the design was not based on a choice of absolute parameters, defined tentatively by the design engineer—a choice which is also possible—but on the acquisition of the parameters relating to an existing tyre, the good handling properties of which were known, but which were of a size different from that desired by the client.

A reference tyre (prototype), size 205/55R16, was chosen, said tyre being close to the size of the new tyres to be designed (245/50R16), in particular having the same fitting diameter as the two new tyres to be made.

The table below specifies the external diameter (D), the fitting diameter (Dc) and the height of the sidewall (Hs) of the three tyres; said values form non-modifiable constraints of the tyres in question.

The table specifies, moreover, the geometrical dimensions considered in the two groups of equations as well as the individual equations of each group. For the reference tyre (prototype) the table specifies the absolute values of these dimensions.

With reference to the two variants of tyres, the table shows the absolute values of the abovementioned dimensions obtained by applying the corresponding equations to the reference values of the prototype.

The laboratory tests and the road tests carried out subsequently on the two variants of tyres showed that the aim of the design was achieved.

It may be observed, in particular, that, for the same overall and fitting dimensions, the handling-oriented tyre has values of the filling height and tread radii which are substantially greater than the corresponding values of the comfort-oriented tyre.

| Prototype | | | | | | |
|---|---|---|---|---|---|---|
| Size | Dp | Dcp | Hsp | Parameter | Value | Geometric meaning |
| 205/55 R16 | 633 | 405.6 | 114.4 | Cbp | 178.28 | Tread width |
| | | | | fp | 10.7 | Tread curvature |
| | | | | R1p | 1091.53 | 1$^{st}$ tread radius |
| | | | | R2p | 196.47 | 2$^{nd}$ tread radius |
| | | | | RRp | 28 | Connecting radius |
| | | | | Ys1p | 45 | Height of first filling point |
| | | | | Rca(1) | 29 | First carcass/radius |

| Variant A - Comfort-oriented | | | | | | |
|---|---|---|---|---|---|---|
| Size | D | Dc | Hs | Parameter | Equations set: COMF_1 | Value |
| 245/50 R16 | 652 | 405.6 | 123.2 | Cb | (Cbp/Hsp)*Hs | 191.9938 |
| | | | | f | (fp/Hsp)*Hs | 11.52308 |
| | | | | R1 | R1p | 1091.53 |
| | | | | R2 | R2p | 196.47 |
| | | | | RR | RRp | 28 |
| | | | | Ys1 | (Ys1p/Hsp)*Hs*1 | 48.46154 |
| | | | | Rca (1)P | (Rca(1)p/RRp)*RR*1.03 | 29.87 |

| Variant B - Handling-oriented | | | | | | |
|---|---|---|---|---|---|---|
| Size | D | Dc | Hs | Parameter | Equation set: HAND_1 | Value |
| 245/50 R16 | 652 | 405.6 | 123.2 | Cb | 1.02*(Cbp/Hsp)*HS | 195.8337 |
| | | | | f | fp | 10.7 |
| | | | | R1 | (R1p/Hsp)*Hs | 1175.494 |
| | | | | R2 | (R2p/Hsp)*Hs | 211.5831 |
| | | | | RR | RRp | 28 |
| | | | | Ys1 | (Ys1p/Hsp/*Hs*1.05 | 50.88462 |
| | | | | Rca(1) | (Rca(1)p/RRp)*RR0*.9 | 26.1 |

Owing to the high degree of flexibility of the tyre design and manufacturing method described above, a new form of interface between the clients and the tyre manufacturer is also possible.

In particular, said method allows the production of tyres configured in accordance with the client's requests.

According to the state of the art, the tyre manufacturers provided the market with a limited number of different tyre models, predefined on the basis of previous knowledge, for example on the basis of statistical analyses of the main requests in terms of sizes and performance: the client was able to choose their product from among the models available.

With the new design method it is possible to introduce into the first group of absolute values (as defined above) also specific requests from a client, relating to a limited batch of tyres, also of the order of single units.

These requests may relate to dimensional parameters, such as, for example, the overall dimensions of the tyres, sizes and tread patterns, structural parameters, such as, for example, particular materials, functional parameters, such as definition of the performance categories, for example high-performance models, high-comfort models, models suitable for particular routes and/or road surfaces. In particular, these requests shall be chosen from the range of dimensional values of the tyre and/or with reference to performance models and performance levels for each model. Preferably, the client will be able to choose their requests from among a list of options made available by the tyre manufacturer.

Preferably, the options offered by the manufacturer establish links between the level or levels of performance required, the category of tyre or vehicle intended for the tyre, and the price range which the client is able to afford.

In accordance with the invention, construction parameters obtained from requests forwarded by clients are converted automatically into instructions for the tyre manufacturing process.

In accordance with the invention, these requests may be sent by the client and received by the tyre manufacturer in real time by means of a link between computers via a public line (the Internet) or private line (dedicated line), i.e. via a telecommunications network which connects a processing system of the manufacturer to a processing system of the client.

The method according to the invention is intended both for a client specialized in the sector, such as a car manufacturer or professional dealer, and for clients who have no specific technical or design skills, for example a private individual.

In order to help the client provide the tyre manufacturer with data suitable for the design and construction of tyres corresponding to the same client's requests, advantageously a data entry mask is provided and made available to the client via a telecommunications network, for example in the form of a Web page on an Internet website.

Said mask allows the said data to be introduced and stored in a form which can be integrated into and is operationally homogeneous with the data determined by the manufacturer and which can be immediately processed by the abovementioned processing system of the manufacturer, since it corresponds to the design and production possibilities of the manufacturer who is using the invention described above.

The entry mask preferably comprises one or more sets of preselected questions which are presented in succession or in groups and are designed to identify the main requirements of the client and consequently guide the latter when making their choices; the mask may also comprise an array of predefined options so as to help the client formulate their request in a coherent manner, avoiding situations of incompatibility between the requirements proposed, in particular from a technical point of view, or unsatisfactory results, for example from a cost point of view.

By means of the abovementioned data entry mask which is made available to the client, the client's requests and other information relating thereto, for example, the number of parts to be produced, the dates, the location for delivery, the methods of payment and the like—irrespective as to whether the models requested may require a new design—may be received and introduced into the manufacturer's processing system, so as to modify production planning, combining the new request with the program which is in operation. This allows the client's request to be dealt with very rapidly and using methods which are most suited to the requirements of the client in question.

Preferably, sending of the order by the client (consisting, for example, in one or more clicks on the Web page provided, together with entry of the data relating to the requests and identification of the said client) starts in real time the verification program and modifies the planning program resident in the manufacturer's processing system.

In response to the order received and verification thereof, conveniently the manufacturer's processing system is also able to generate information in response to the client, sending it for example, via the same line or network on which the request was received, said information including, depending on the circumstances, confirmation of acceptance of the order, methods of payment, cost, dates and methods for delivery of the product, or other logistical and cost-related information.

The invention claimed is:

1. A method for designing a tyre, comprising:
    defining at least one profile of the tyre based on a group of predefined dimensional constraints;
    defining at least one additional profile of the tyre based on predefined dimensional values of structural parts of the tyre;
    defining, within a cross-section of the tyre, shapes of the structural parts of the tyre; and
    approximating each shape by filling with a respective basic component depending on a function of the respective structural part;
    wherein the tyre comprises a plurality of the structural parts,
    wherein each of the structural parts comprises one of the basic components,
    wherein at least some of the structural parts are different from each other in terms of composition, position within the cross-section of the tyre, or one or more dimensions,
    wherein one of the structural parts comprises at least one carcass ply disposed within the cross-section of the tyre along a predefined profile, and
    wherein the cross-section of the tyre is defined by a radially-external profile and a radially-internal profile.

2. The method of claim 1, further comprising:
    associating a first group of absolute values with each of the structural parts.

3. The method of claim 2, wherein associating a first group of absolute values comprises defining dimensional characteristics of the structural parts.

4. The method of claim 2, wherein associating a first group of absolute values comprises defining chemical and physical properties of materials forming the structural parts.

5. The method of claim 1, further comprising:
    associating a second group of variables with each of the structural parts;
    wherein the second group of variables can be modified for each of the structural parts.

6. The method of claim 5, wherein associating a second group of variables comprises calculating at least one of the variables, and
    wherein the at least one of the variables can be modified as a function of a distance between the predetermined profile and one of the radially-external or radially-internal profiles.

7. The method of claim 1, wherein defining at least one profile of the tyre comprises ensuring that at least one portion of the predetermined profile satisfies a condition that, for one or more points on the predetermined profile, a radius of curvature at a respective point multiplied by a distance of the respective point from a fitting diameter of the tyre is equal to a constant value.

8. The method of claim 7, wherein the condition is satisfied in a zone of the tyre sidewalls.

9. The method of claim 1, wherein the predetermined profile corresponds to a profile of the at least one carcass ply in an inflated condition of the tyre.

10. The method of claim 1, wherein defining at least one profile of the tyre comprises defining the radially-external profile of the tyre, and
    wherein the group of predefined dimensional constraints comprises one or more of fitting size, external diameter, and maximum chord of the tyre.

11. The method of claim 1, wherein approximating each shape by filling comprises disposing a plurality of cross-sections of the respective basic component in a vicinity of each other.

12. The method of claim 11, wherein disposing a plurality of cross-sections of the respective basic component in a vicinity of each other generates instructions for manufacturing the structural part associated with each of the shapes.

13. The method of claim 12, wherein the instructions for manufacturing comprise positioning a point of the cross-section of each basic component and orientating at least one portion of a contour of each cross-section with respect to a reference axis.

14. The method of claim 1, wherein defining shapes of the structural parts comprises positioning each shape inside the cross-section of the tyre.

15. The method of claim 14, wherein positioning each shape generates a plurality of relations between various dimensional values of the structural parts of the tyre.

16. The method of claim 15, wherein, once the dimensional values of the structural parts of the tyre have been fixed for a given tyre size, the plurality of relations defines respective dimensional values of the structural parts for tyres with a size different from the given tyre size.

17. The method of claim 16, wherein the defining of the respective dimensional values of the structural parts for tyres with a different size is performed automatically.

18. The method of claim 12, wherein the tyre is structurally defined by a plurality of machine cycles, and
    wherein each machine cycle comprises the instructions for manufacturing a respective structural part.

19. The method of claim 1, wherein at least one of the predefined dimensional constraints is derived from a specific request of a client.

20. The method of claim 19, wherein the specific request is introduced into the group of predefined dimensional constraints using an on-line connection between a processing system of the client and a processing system of a manufacturer.

21. The method of claim 2, wherein at least one of the absolute values of the first group is derived from a specific request of a client.

22. The method of claim 21, wherein the specific request is introduced into the first group of absolute values using an on-line connection between a processing system of the client and a processing system of a manufacturer.

23. A method for producing at least one tyre satisfying requirements of a client, comprising:
    receiving from the client a set of data;
    combining the client data set with predefined construction data;
    designing a structure of the at least one tyre using predefined correlation equations;
    generating construction procedures for the structure of the at least one tyre; and
    constructing the at least one tyre comprising characteristics satisfying the client data set;
    wherein the client data set comprises data identifying the client, wherein the client data set further comprises data related to dimensional requirements, performance requirements, or dimensional and performance requirements of the at least one tyre, wherein the client data set is received from the client via a communication link between a computer of the client and a computer of a manufacturer, and wherein the structure of the at least one tyre is designed based on the client data set and the predefined construction data.

24. The method of claim 23, wherein generating construction procedures comprises storing geometrical data related to deposition of one or more structural parts, and wherein the one or more structural parts are defined during the design of the structure of the at least one tyre.

25. The method of claim 23, wherein designing a structure of the at least one tyre comprises automatically generating the construction procedures.

26. The method of claim 23, wherein designing a structure of the at least one tyre comprises automatically constructing the at least one tyre.

27. A method for producing at least one tyre satisfying requirements of a client, comprising:

supplying the client with a predefined set of requested data, comprising:
  data identifying the client;
  data related to dimensional requirements, performance requirements, or
    dimensional and performance requirements of the at least one tyre;
receiving from the client a client data set in response to the requested data;
combining the client data set with predefined construction data;
designing a structure of the at least one tyre using predefined correlation equations;
generating construction procedures for the structure of the at least one tyre; and
constructing the at least one tyre according to the construction procedures;
wherein the predefined set of requested data is supplied to the client via a communication link between a computer of the client and a computer of a manufacturer, and wherein the structure of the at least one tyre is designed based on the client data set and the predefined construction data.

28. The method of claim 27, wherein generating construction procedures comprises storing geometrical data related to deposition of one or more structural parts, and wherein the one or more structural parts are defined during the design of the structure of the at least one tyre.

29. The method of claim 27, wherein designing a structure of the at least one tyre comprises automatically generating the construction procedures.

30. The method of claim 27, wherein designing a structure of the at least one tyre comprises automatically constructing the at least one tyre.

31. A method for producing at least one tyre, comprising:

obtaining information from a client's processing system;

supplying the information to a manufacturer's processing system;

obtaining manufacturing instructions based on the information; and manufacturing the at least one tyre using the manufacturing instructions;

wherein the information comprises data related to dimensional requirements, performance requirements, or dimensional and performance requirements of the at least one tyre, wherein the information is correlated to a client purchase request, wherein the manufacturing instructions are obtained via the manufacturer's processing system, wherein the manufacturer's processing system is connected to a computer-controlled tyre factory via a communications link, and wherein the at least one tyre is manufactured at the computer-controlled tyre factory.

32. The method of claim 31, wherein the client purchase request is from the client's processing system.

* * * * *